United States Patent Office 2,718,119
Patented Sept. 20, 1955

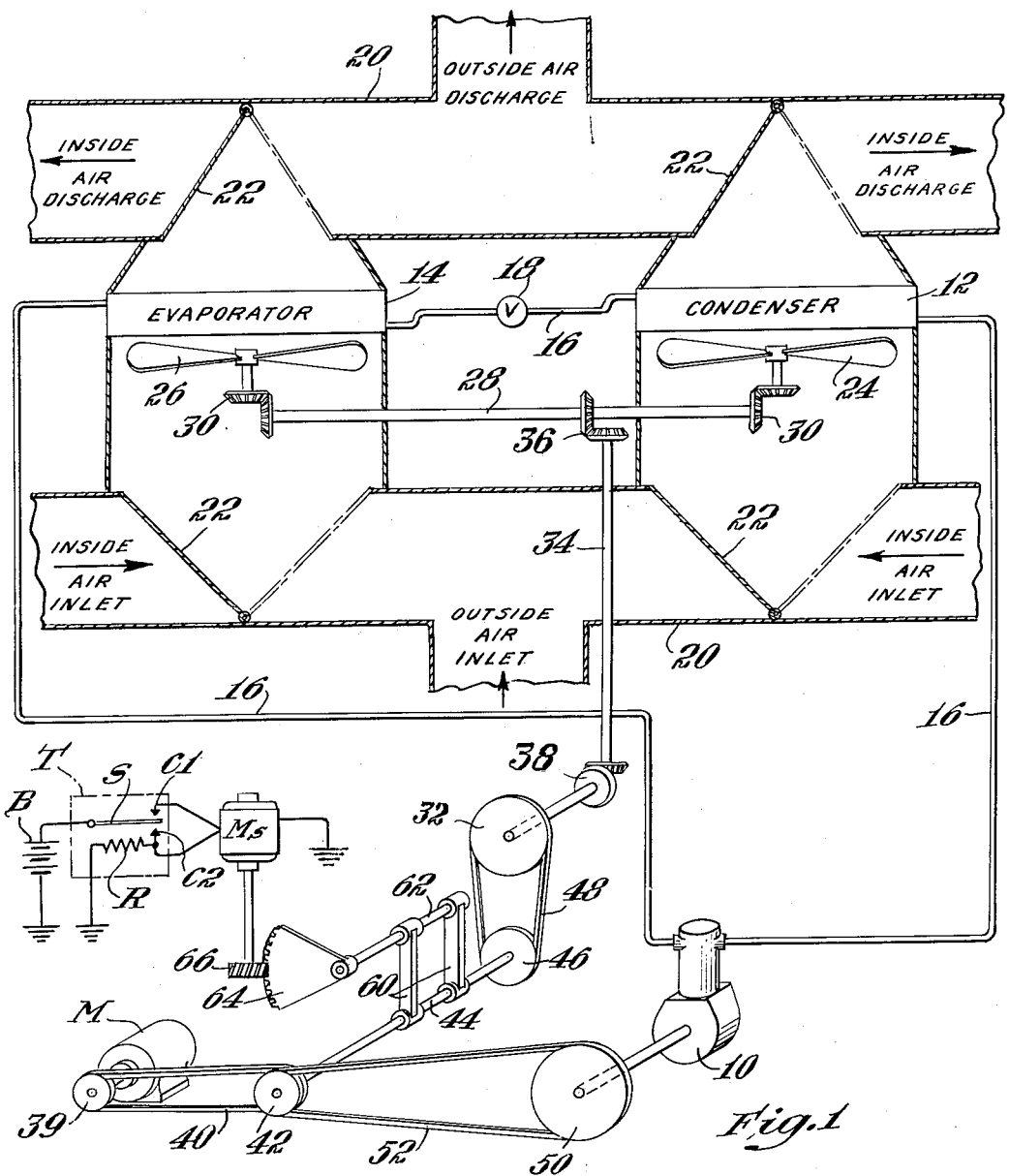

2,718,119

HEAT PUMP

David C. Prince, Schenectady, N. Y.

Application December 31, 1952, Serial No. 329,005

17 Claims. (Cl. 62—3)

This invention relates to heat pump systems and more particularly to the control of such systems.

Heretofore heat pump systems have been designed for constant speed start-stop operation in response to changing heat load conditions requiring that the operating speeds of both the refrigerant compressor and the circulating fans for the evaporator and capacitor be great enough to meet the requirement of the most severe duty required thereof. In a favorable geographical location, operating in the above manner, it is possible to approach 2.8 as a coefficient of performance, defined as the ratio of the output heat units delivered to the input heat units supplied as electrical power. By modulating the compressor so that its output is reduced at lighter loads, it is possible to increase slightly the coefficient of performance, but the overall gain realized in this manner is limited by the power required to drive the fans which at light loads becomes the dominating factor. The delivery of the compressor is a function of the first power of its speed whereas the delivery of the fans varies as the square of their speed so that for optimum operating conditions, the relative reduction of the fan speed under lighter load conditions should be less than speed reduction of the compressor.

Objects of this invention are to provide a heat pump system which has a high coefficient of performance, which has a high efficiency, which permits speed of the compressor and fans to be varied simultaneously, which permits a relatively greater change in the speed of the compressor than in the speed of the fans, which is responsive to changes in a control temperature, which provides a temperature modulated flow of heat, which is automatic in operation, which can be adapted for use with existing equipment, and which advances the art generally. A further object is to provide a speed regulating system whereby it is possible to vary conjointly the speeds of two output loads.

A heat pump system according to the present invention comprises a compressor which is connected in series with two heat exchangers that act respectively as a condenser and an evaporator. The compressor and the fans or other circulating means for causing ambient fluid to pass over the heat exchangers are driven by means whereby the speeds thereof vary as functions of a control temperature, the speed variation of the compressor preferably being materially greater than the speed variation of the fans for a given change in the control temperature. In another aspect the compressor and fans impose output loads upon a speed changer such as a compound pulley, which is driven from a common input power source such as a prime mover.

These and other objects and aspects of the invention will be apparent from the following description of a specific embodiment of the invention which refers to a drawing wherein:

Fig. 1 is a schematic diagram of a heat pump; and

Fig. 2 is a side view of a compound pulley for use in the system.

As is shown in Fig. 1, the heat pump system comprises a refrigerant compressor 10 which may be of any of the well known commercially available types. The compressor 10 is connected in series with two heat exchangers 12 and 14 by means of fluid-tight conduits such as the tubing 16. An expansion valve 18 is interposed in the tubing connecting the heat exchangers 14 and 16 so that they act respectively as a condenser and an evaporator when a refrigerant is circulated therethrough by the compressor 10.

The condenser 12 and the evaporator 14 are enclosed in a ductwork system 20 which is provided with four dampers 22. With the dampers 22 in the position shown in Fig. 1, air from inside an enclosure such as a building or house (not shown) is circulated through the condenser 12 by a fan 24 so that heat from the condenser is used for heating the interior of the enclosure. A second fan 26 simultaneously circulates outside air through the evaporator 14 to increase the temperature of the refrigerant to add heat to the system. When the outside air temperature exceeds that desired in the interior of the enclosure the dampers 22 are transferred either manually or automatically to the positions shown by broken lines in Fig. 1, whereby the heat from the condenser 12 is dissipated outside and the inside air passing through the evaporator 14 is cooled so that the system acts as an air conditioner.

The fans 24 and 26 are operated from a common drive including shaft 28 and beveled gears 30. The shaft 28 is connected with a sheave 32 by means of an intermediate shaft 34 and two pairs of beveled gears 36 and 38 located respectively at either end thereof. The sheave 32 is driven from a prime mover such as the motor M by means of a simple pulley 39, a V-belt 40, a speed changer including a variable compound pulley 42 and a pulley shaft 44 which is displaceable in a radial direction as will be described in detail below, a mating sheave 46 attached to the pulley shaft and a V-belt 48. The motor M also acts as the common power source for the compressor 10, a simple pulley 50 on the compressor shaft being connected with the compound pulley 42 by a V-belt 52.

As is best shown in Fig. 2, in which the belts 40 and 52 are not delineated, the compound pulley 42 comprises two spaced sheave portions 54 and 55 which are relatively fixed to the shaft 44 by means of keys or set screws (not shown). Interposed between the fixed sheave portions 54 and 55 is a movable sheave portion 56 which is slidable axially along the shaft 44. The V-belt 40 from the motor pulley 39 is interposed in the V-notch formed by the fixed sheave portion 54 and the slidable sheave portion 56, the effective diameter of the driven sheave formed thereby and the speed of the shaft 44 being determined by the axial position of the slidable sheave portion, it being evident that as the slidable sheave portion is moved towards the fixed sheave portion, the effective sheave diameter is increased and the resulting driven sheave rotates the pulley shaft 44 at a slower speed. Conversely, as the slidable sheave portion 56 moves away from the fixed sheave portion 54, the effective sheave diameter is decreased and the shaft speed is increased. The movement of the slidable sheave portion 56 has the opposite effect to that described above upon the sheave formed by the slidable sheave portion 56 and the fixed sheave portion 55 wherein is carried the V-belt 52 for driving the compressor 10, i. e., as the effective diameter of the first sheave driven by the motor M is increased (or decreased) the effective diameter of the second sheave driving the compressor decreases (or increases) correspondingly. As the first sheave is driven and the second sheave is driving, their effect upon the speed of the compressor is cumulative and it is possible to obtain a 4 to 1 variable speed range of the shaft 44 driving the fans with a corresponding 16 to 1 variable speed range of the compressor 10.

The axial position of the slidable sheave portion 56 is controlled by the swinging of the pulley shaft 44 in a large arc which imparts a displacement to the shaft 44 and attached pulley 42 thereby tightening one of the belts and slackening the tension in the other belt, the particular belt being tightened depending upon the direction in which the displacement of the shaft 44 takes place. The reaction force to the belt tension is supplied by the inclined faces of the corresponding sheave portions which are inclined so that there is an axial force component which tends to separate the movable sheave from the stationary sheave. As the other belt is conjointly slackened there is no opposing force so that the slidable sheave portion moves until it reaches a position of equilibrium which corresponds to the particular displacement of the pulley shaft 44.

The above mentioned displacement which results in a substantially radial movement of the shaft 44 is obtained by journalling the shaft in bearings in a bracket 60 which is pivotally mounted as at 62. The bearing bracket 60 is rotated about its pivot point 62 by a gear segment 64 whose teeth mesh with a pinion 66 upon the shaft of a reversible control motor Ms. A source of direct power such as the battery B is used to energize the control motor Ms. To this end one terminal of the battery is connected to the motor Ms through ground. The other battery terminal is alternatively connected to the separate reversing windings of the motor Ms by contacts C1 and C2, respectively, of a thermostat T which is located so that its bi-metallic element S is subject to a control temperature, for example, the ambient air within the enclosure. The closing of the contact C1 when the ambient temperature exceeds the control temperature, energizes the winding of the control motor Ms which results in a movement of the shaft 44 in a direction to tighten the belt 52 and slacken the belt 40, as described heretofore, thereby to slow down the compressor 10 and to decrease the heat output of the system. The fans 24 and 26 are also slowed down but because of the action of the compound pulley 42 the reduction is proportionately less thereby to accommodate the reduced heat output.

Conversely, when the ambient temperature falls below the control temperature the contact C2 closes to reverse the motor Ms to move the shaft 44 in a direction to tighten the belt 40 and the belt 52 slackens so that the speed of both the fans and compressor 10 are increased to raise the heat output of the system. If the ambient temperature is only a little below the control temperature the heat from a heater resistor R located adjacent the bi-metallic strip S will cause the contacts to open before there has been much movement of the gear segment 64. The ratio of the pinion 66 and the segment 64 is made low so that the movement of the bearing bracket 60 is slow and the change in the heat output of the system is not materially effected until the drop in ambient temperature is sufficient to overcome heating effects from the resistor R.

The above described system provides a steady flow of heat which is modulated so as to avoid abrupt changes in temperature at the same time increasing the co-efficient of performance to a value of 8 or 9 which represents a material gain in the overall efficiency. A corresponding gain is realized when the system is used for cooling when the dampers 22 are moved to the dotted position.

I claim:

1. A heat pump system comprising two heat exchangers, refrigerant circulating means connected in series with the heat exchangers whereby the refrigerant is forced therethrough, an expansion valve interposed between said heat exchangers so that they act respectively as a condenser and an evaporator for the refrigerant, further circulating means for causing ambient fluid to pass over the heat exchangers, variable speed driving means operating each of the circulating means over a range of speeds, and control means for the driving means which is responsive to changes in a control temperature to vary the speeds of the circulating means respectively as functions of the control temperature, the variation in the speed of the refrigerant circulating means being materially greater than the variation in speed of the ambient fluid circulating means for a given change in the control temperature.

2. A heat pump system comprising a refrigerant compressor, two heat exchangers connected in series with the compressor whereby the refrigerant is forced therethrough, an expansion valve interposed between said heat exchangers so that they act respectively as a condenser and an evaporator for the refrigerant, means including one or more fans for selectively circulating either indoor or outdoor air past said heat exchangers, variable speed driving means for operating the compressor and fans over a range of speeds, and control means for the driving means which is responsive to changes in a control temperature to vary the speeds of the compressor and fans respectively as functions of the control temperature, the variation in the speed of the compressor being materially greater than the variation in the speed of the fans for a given change in the control temperature.

3. A heat pump system according to claim 2 wherein the driving means includes a common prime mover to drive both the compressor and fans.

4. A heat pump system according to claim 3 wherein the prime mover is operated at a substantially constant speed and speed changing means responsive to variations in the control temperature are interposed between the prime mover and the compressor and fans.

5. A heat pump system according to claim 4 wherein the speed changing means causes a materially greater variation in the speed of the compressor than in the speed of the fans for a given change in the control temperature.

6. A heat pump system according to claim 5 wherein the speed changing means includes a variable speed pulley.

7. A heat pump system according to claim 6 wherein the variable speed pulley is a compound pulley and the shaft whereupon the pulley is mounted forms a portion of the driving means for the fans.

8. A heat pump system according to claim 7 wherein the variable speed pulley includes a movable sheave portion which is arranged to slide axially upon the pulley shaft and two relatively fixed sheave portions which are attached to the pulley shaft upon either side respectively of the movable sheave portion thereby to form two sheaves whose effective diameters are varied inversely by the axial movement of the movable sheave portion.

9. A heat pump system according to claim 8 wherein the speed changing means includes two belts which interconnect the prime mover and compressor with the respective sheaves of the compound pulley.

10. A heat pump system according to claim 9 wherein means are provided for displacing the pulley shaft in a substantially radial direction in response to changes in a control temperature.

11. A heat pump system according to claim 10 further including a pivotally mounted bracket having bearings wherein is journalled the pulley shaft so that the shaft is displaceable in a substantially radial direction.

12. A heat pump system according to claim 11 further including a reversible motor for moving the bearing bracket about its pivotal mounting in either direction and a thermostat for controlling the operation of the motor so that a temperature change results in the movement of the bracket and a change in the effective diameter of the sheaves thus varying the speed of the compressor and fans.

13. A drive for regulating the speed of two separate loads comprising an adjustable compound pulley having two sheaves whose effective diameters are inversely variable, a shaft for connecting the compound pulley with one of the loads, two simple pulleys each of which is mounted upon a respective shaft, the shaft of one simple pulley being connected to the other load, the shaft of the second simple pulley being connected to an input power source, a belt connecting each of the simple pulleys with a respective sheave of the compound pulley, and means for adjusting the effective diameters of the sheaves of said compound pulley conjointly to vary the speed of the output loads whereby for a given speed of the input power source adjustment of the compound pulley causes a materially greater change in the speed of the load connected to the simple pulley than the change in speed of the load connected to the compound pulley.

14. A drive for regulating the speed of two separate loads according to claim 13 wherein the compound pulley comprises a movable sheave portion which is arranged to slide axially upon the shaft and two relatively fixed sheave portions which are attached to the shaft upon either side respectively of the movable sheave portion so that the effective diameters of the sheaves formed thereby are varied inversely by the axial movement of the movable sheave portion.

15. A drive for regulating the speed of two separate loads according to claim 14 wherein the compound pulley and its correlated load are journalled in a bearing bracket which is pivotally mounted to displace the shaft in a substantially radial direction thereby to cause the movable sheave portion to slide axially thus changing the speeds of the respective loads.

16. A drive for regulating the speed of two separate loads according to claim 15 wherein a reversible motor is connected to move the bearing bracket in response to an input signal.

17. A drive for regulating the speed of two separate loads according to claim 16 wherein the input signal source is a thermostat.

References Cited in the file of this patent
UNITED STATES PATENTS

| | | |
|---|---|---|
| 1,942,295 | Kerr | Jan. 2, 1934 |
| 2,045,870 | Paton | June 30, 1936 |
| 2,219,184 | Herman | Oct. 22, 1940 |
| 2,308,507 | Hallinan | Jan. 19, 1943 |
| 2,392,226 | Butterworth | Jan. 1, 1946 |
| 2,486,524 | Dulaney | Nov. 1, 1949 |
| 2,549,637 | Reeves | Apr. 17, 1951 |
| 2,637,175 | Alexander | May 5, 1953 |

FOREIGN PATENTS

| | | |
|---|---|---|
| 89,666 | Switzerland | June 16, 1921 |